United States Patent [19]

Michaelsen et al.

[11] 4,321,889
[45] Mar. 30, 1982

[54] LIVESTOCK LOADING DEVICE

[76] Inventors: Marcus H. Michaelsen, 106 Robin Rd., Council Bluffs, Iowa 51501; Norman E. Dorn, 1215 Counts Rd., SE., South Solon, Ohio 43153

[21] Appl. No.: 222,464

[22] Filed: Jan. 5, 1981

[51] Int. Cl.³ ............................................. A01K 29/00
[52] U.S. Cl. ..................................... 119/82; 198/316
[58] Field of Search ................... 119/82; 198/315, 316, 198/317, 318

[56] References Cited

U.S. PATENT DOCUMENTS

| | | | |
|---|---|---|---|
| 903,157 | 11/1908 | Allen | 119/82 |
| 1,247,114 | 11/1917 | Howard | 193/2 |
| 2,675,783 | 4/1954 | Sears | 119/82 |
| 2,840,041 | 6/1958 | Fleming | 119/82 |
| 3,389,690 | 6/1968 | Jerome | 119/82 |
| 3,389,780 | 6/1968 | Jerome | 198/165 |
| 3,702,600 | 11/1972 | Bright et al. | 119/82 |
| 3,916,835 | 11/1975 | Reynolds | 119/82 |
| 3,929,104 | 12/1975 | Corbin | 119/82 |

*Primary Examiner*—Hugh R. Chamblee
*Attorney, Agent, or Firm*—Henderson & Sturm

[57] ABSTRACT

A livestock loading device having a motorized conveyor belt, travelling on a variable height platform. The device is installed inside a livestock finishing building, with one end of the platform constrained to travel in a vertical plane within the doorway of the building. The opposite end of the platform is constrained within a track mounted on the floor of the building. The platform has vertical sidewalls, and horizontal side walkways. A pivoting attachment connects the platform to a wheeled frame, and a safety switch prevents over extension of the lift mechanism while accidental lowering of the platform is prevented by a safety switch.

8 Claims, 6 Drawing Figures

LIVESTOCK LOADING DEVICE

BACKGROUND OF THE INVENTION

This invention is primarily for use in the loading of livestock onto trucks, and may also be used for the unloading of livestock in a similar manner. The typical livestock trailer is of a double decked design, therefore, the livestock loader must be able to accomodate the loading and unloading of livestock at variable heights above the ground. The present invention is designed to be installed within a modern livestock finishing building, such as a hog or cattle finishing shed, but may be successfully employed anywhere the loading or unloading of livestock is required.

Those concerned with the problem of loading livestock have generally resorted to the use of a crude ramp device which requires that the livestock be forced or shooed up the ramp into the truck. This technique, although still in use, often leads to bruising or unduly exciting the animal, and requires the use of additional workmen to accomplish the process.

Another problem encountered in the loading of livestock is, that livestock animals tend to be nervous and jumpy whenever placed in a new environment. The additional handling required to load a truck through the use of a simple ramp only aggravates the nervous condition of the animals. There is a need for a device which both saves stress and strain on the animals during the loading process, and reduces the amount of work required to successfully load a vehicle with livestock.

Description of the Prior Art

In the field of livestock loading, the use of plain wooden ramps is well known, as is the use of vertical sidewalls affixed to the ramp to prevent the livestock from leaving the ramp other than through either of the ends of the ramp. The use of a motor driven conveyor belt to forcibly drive the livestock through the ramp is also known. U.S. Pat. No. 3,702,600, issued to Charles Bright et al., on Nov. 14, 1972, teaches the use of a motorized belt and vertical sidewalls to restrain the animals during loading. The Bright et al. patent also shows the use of a hydraulic cylinder to raise and lower one end of the ramp. U.S. Pat. No. 1,247,114, issued to Richard Howard on Nov. 20, 1917, likewise teaches the use of a powered belt, vertical sidewalls, and hydraulic height adjustment. The Howard patent teaches a device employed for the loading of large animals onto railroad stock cars. Both of these inventions are designed to be used out of doors. This requires that additional maintenance be performed on each device to overcome the added wear and tear caused by weathering and exposure to the elements.

The Howard invention requires an extensive mechanism to allow the device to be moved away from the path of a moving train, and therefore, is more complicated than a device designed to be installed indoors. Both the Bright et al patent, and the U.S. Pat. No. 3,389,780, issued to Wallace Jerome on June 25, 1968, cover portable loading devices, designed for the loading of poultry or small animals. Neither of these devices would be suitable for the loading of large animals without the addition of suitable stabilizing equipment to prevent the loader from moving during the loading of heavy animals, which often weigh upwards of a ton or more. Subsequently, those familiar with the field of livestock handling recognize the need for an improved livestock loader.

SUMMARY OF THE INVENTION

The present invention relates to a livestock loading device designed for use within a hog or cattle finishing building. A conveyor belt travels on a conveyor platform, having a first upper end and a second lower end, the device is provided with a driving motor and a lifting mechanism to elevate the first end of the conveyor platform to the required height. A frame underneath the lift supports both the conveyor platform and the lift mechanism, wheels are mounted on the frame allowing it to roll. A vertical track is employed in the door jamb of an opening in the building, and a rod or similar device attached to the first upper end of the conveyor engages the track mounted in the door jamb. A second track is mounted on the floor, engaging the wheels on the frame near the second end of the conveyor.

The conveyor belt consists of a rough topped endless belt commonly found in the art of power driven conveyors. This belt runs on a conveyor support platform consisting of a plurality of spaced apart platform rollers. The conveyor belt is equipped with a belt tightening mechanism to allow the tension in the belt to be periodically adjusted. The conveyor platform also contains vertical sideboards mounted on either side of the conveyor, and is equipped with an exit chute at the first or upper end of the conveyor, and an entry ramp at the second or lower end of the conveyor. A vertical frame member with an upper and lower end is attached to the frame opposite the second lower end of the conveyor. This vertical frame member contains a removable safety stop pin which prevents the conveyor from unexpectedly lowering should the lift mechanism fail, and an automatic cut out switch is provided at the top of the vertical frame member to automatically stop the lift once the conveyor reaches a predetermined height.

It is an object of the present invention is to provide an improved livestock loader.

Another object of the invention is to provide a livestock loader capable of loading large numbers of livestock in a relatively short period of time, with a minimum of stress or bruising of the animals.

A further object of the invention is to provide a livestock loader which is self-aligning and therefore does not require that the loader be repeatedly aligned with the truck or transporting vehicle.

Still another object of the present invention is to provide a livestock loader which is both adjustable in height and safe to operate without the danger that it will fall and cause injury after a malfunction of the device.

A further object of the invention is to provide a hog loader device which is both reversible in direction and adjustable in speed.

It is still another object of the invention to provide an improved livestock loader which will automatically disengage the lift mechanism when the conveyor reaches a predetermined height.

Yet a further object of the present invention is to provide a livestock loader which is simple to operate, yet economical, dependable and durable.

Other objects, advantages and novel features of the invention will become apparent from the following detailed description of the invention when considered in conjunction with the accompanying drawings.

DESCRIPTION OF THE PREFERRED EMBODIMENT

Figure 1:
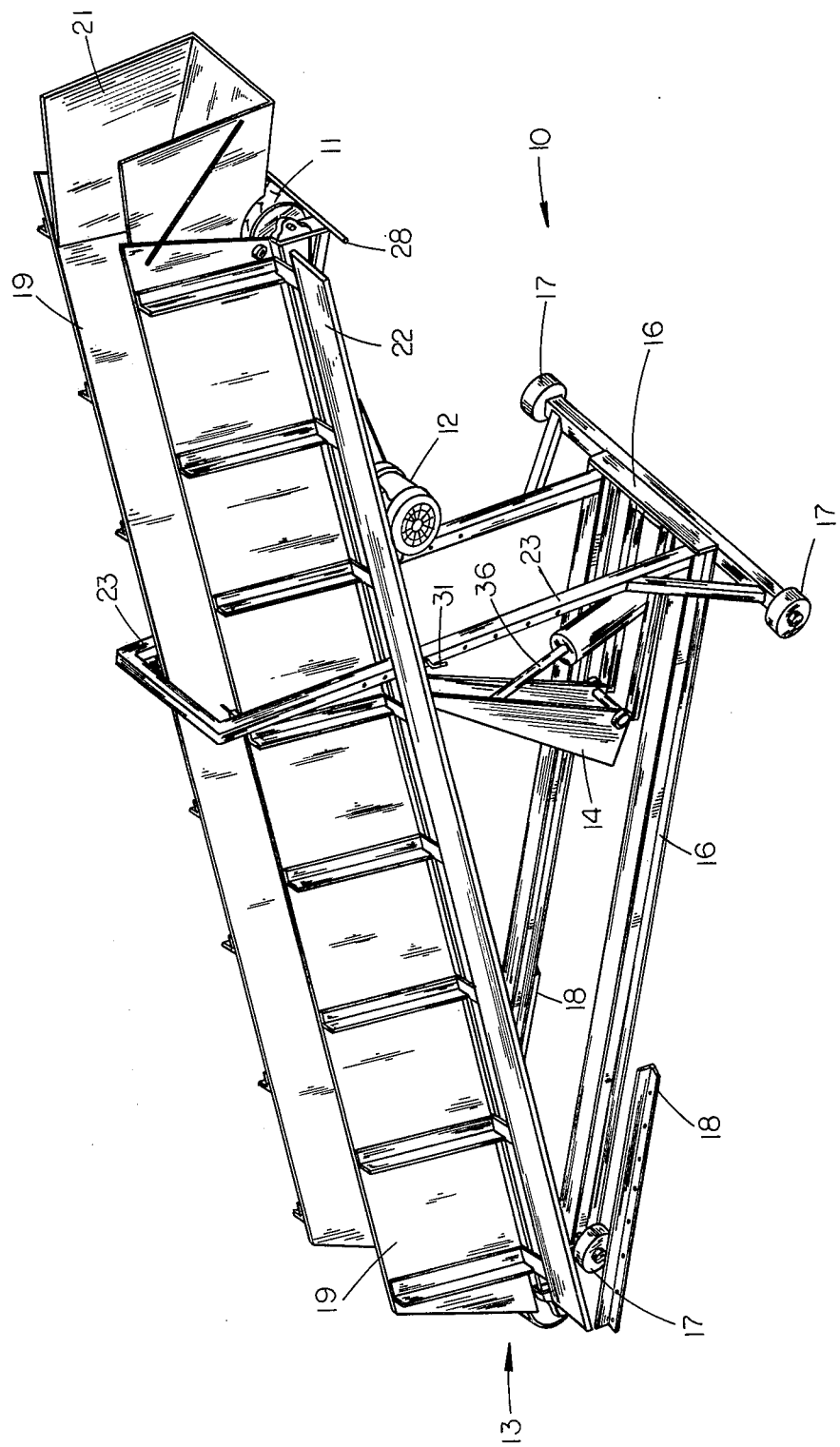
FIG. 1 is side perspective view of the preferred embodiment of the present invention.

Referring now to the drawings, wherein like reference numerals indicate like structures or elements throughout the several views, and more particularly to FIG. 1, the livestock loader device 10 is shown comprising a frame 16 and a conveyor platform 13. The conveyor platform 13 (best seen in FIGS. 3, 4 and 5) is made up of a pair of platform rails 35 and spaced apart platform rollers 37 (the rollers are best shown in FIG. 5), and a belt 11. Projecting vertically from the platform rails 35 are side boards 19, and projecting outwardly in a horizontal manner along the length of the platform rails 35 are catwalk platforms 22. Extending from the upper end of the conveyor platform 13 is hinged chute 21 which provides an exit ramp and prevents the animals from falling or tripping as they pass the upper end of the device. Also located near the chute 21 and affixed to platform rails 35, is door track engaging rod 28. (The function of door track engaging rod 28 will be described in detail below.) Frame 16 includes frame wheels 17 and upright vertical frame member 23. Frame 16 also serves as the base for lift mechanism 14 which includes lift cylinder 36.

Figure 6:
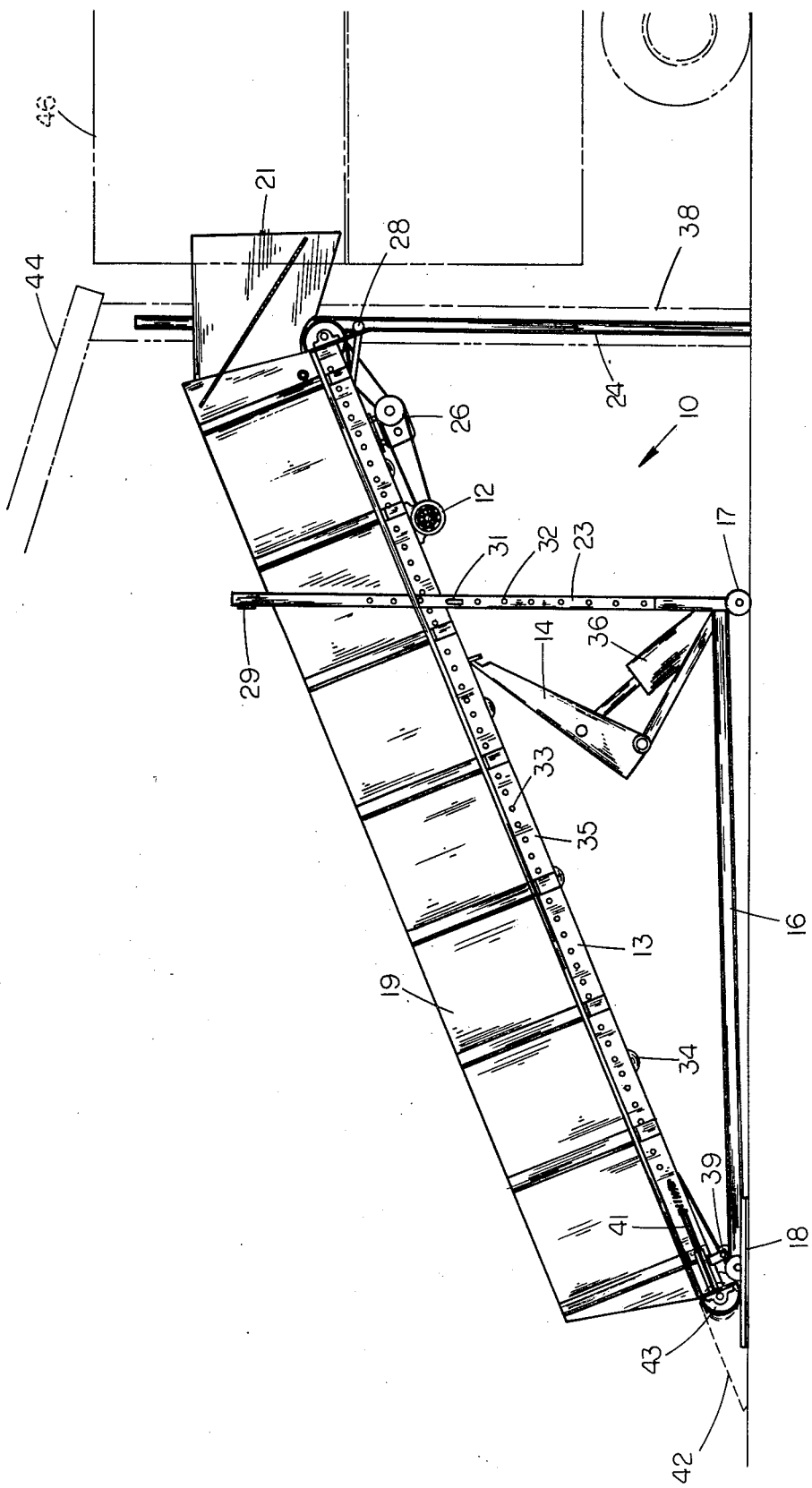
FIG. 6 is a right side elevational view of the invention installed in a livestock finishing building with both the finishing house and a livestock truck shown in phantom lines.

A pair of parallel spaced floor track members 18 are also shown. These track members 18 are spaced apart, slightly more than the distance between the frame wheels 17 located on frame 16 at the lower end of conveyor platform 13. These track members 18 are affixed to the floor of a livestock building and serve to prevent lateral movement of the loader, and allow wheels 17 to travel only in a direction parallel to the direction of movement of belt 11. The functioning of track members 18 will be further discussed below, in conjunction with the operation of vertical door track members 24, (not shown in FIG. 1, but as shown in FIGS. 2 and 6).

Figure 2:
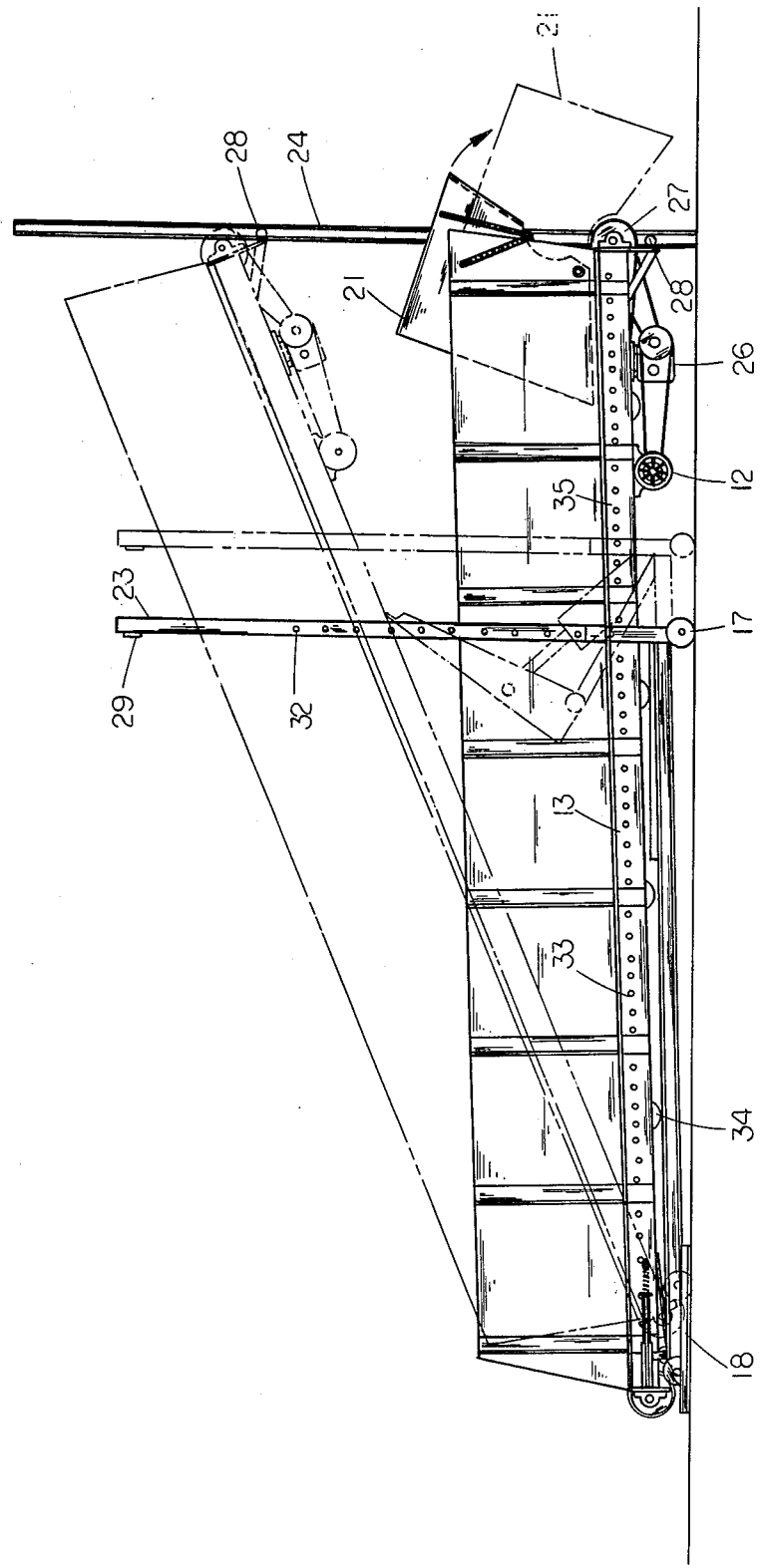
FIG. 2 is a right side elevational view of the preferred embodiment of the present invention illustrated in two positions: the conveyor in a lowered position being shown in solid lines; and the conveyor in a raised position being shown in phantom lines.

Referring now to FIG. 2, the location and employment of vertical door track 24 is shown. Vertical door track 24 engages door track engaging rod 28, and restricts the movement of the upper end of conveyor platform 13 to a substantially vertical plane. As the upper end of conveyor platform 13 is raised and lowered by the lift mechanism 14, the lower end of conveyor platform 13 moves longitudinally within track 18. The cooperation of vertical door track 24 and door track engaging rod 28 with floor track 18 and frame wheels 17, precisely locates livestock loader 10 within a limited area.

This design allows the device to always be properly aligned with the loading door of the livestock building in which it is installed; thus, eliminating the need to position the device by rolling it into position.

FIG. 2 also illustrates the mechanism for driving conveyor belt 11, this mechanism comprises a motor 12, a reduction gearing box 26 and a drive wheel 27. In the preferred embodiment disclosed, motor 12 is a variable speed, electrically powered, one and one-half horsepower motor which is reversible. This motor, through the reduction gearing 26 is capable of driving the belt at a maximum speed of approximately one hundred feet per minute. The reversibility of the motor allows the device to operate to load or unload animals; the motor speed should be adjustable to allow the belt speed to be reduced as loading of a vehicle nears completion, and the livestock become tightly packed in the vehicle. Obviously, other types of hydraulic or power take-off drives can be engineered to satisfactorily drive belt 11.

Drive wheel 27 is located at the upper end of conveyor platform 13. This allows belt 11 to be under tension as it passes over the top of conveyor platform 13 during the loading of a transport vehicle. Conveyor platform 13 comprises conveyor rails 35 as shown, and a plurality of parallel spaced apart conveyor rollers 37, as represented in FIG. 2 by conveyor roller axles 33 appearing along the length of conveyor rails 35. (Rollers 37 are best seen in FIG. 5). The belt 11 returns down the conveyor platform 13 by passing over the upper side of a number of return idler rollers 34 which allow clearance for belt 11 as it passes over lift 14, when the conveyor platform is lowered.

The functioning of hinged chute 21 is illustrated in FIG. 2 and is shown in both the storage or up position, and the loading or down position. When in the down position, the edge of chute 2 is in contact with the floor of the transport vehicle (as shown in FIG. 6). This prevents the animals from tripping as they pass over drive wheel 27 during loading or unloading. The location of safety switch 29 is also shown, this switch allows the lift mechanism 14 to be automatically deactivated when the conveyor platform 13 reaches a predetermined height. Safety switch 29 is designed to prevent the livestock loading device from damaging itself or surrounding structures due to over extension of the lift mechanism 14.

Figure 3:
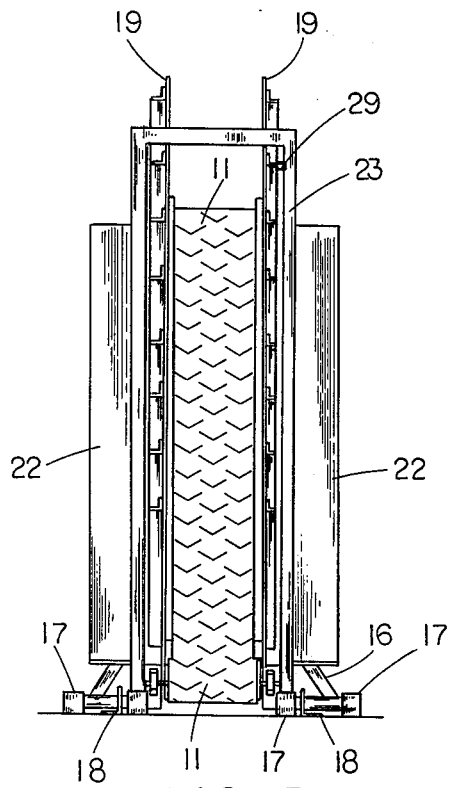
FIG. 3 is a rear elevational view of the preferred embodiment of the present invention with the conveyor in a raised position.
Figure 4:
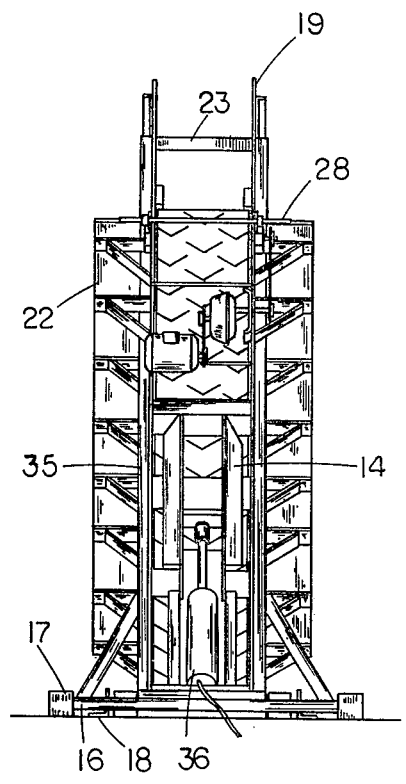
FIG. 4 is a front elevational view of the preferred embodiment of the invention, with the conveyor in a raised position.
Figure 5:
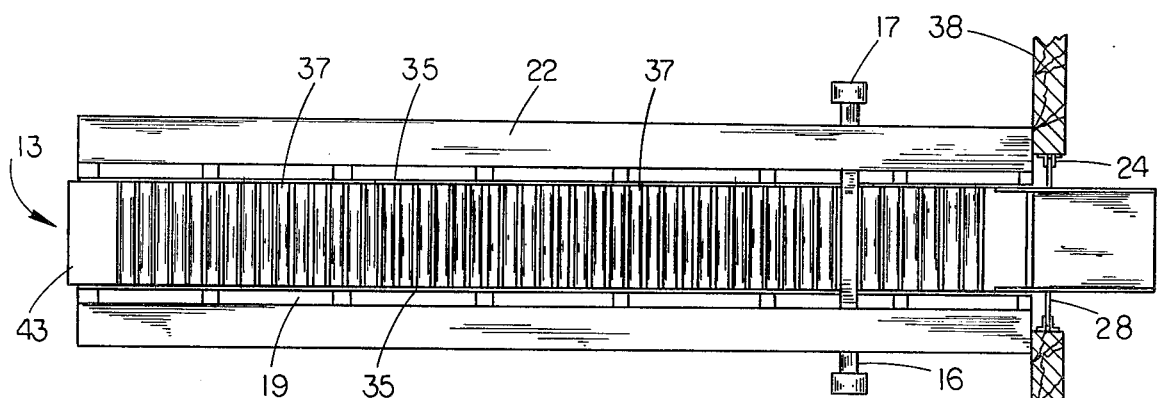
FIG. 5 is a top plan view of the invention with the conveyor belt removed.

In reference now to FIGS. 3, 4 and 5, the location and purpose of catwalks 22 is shown. Catwalks 22 provide a convenient platform for a worker to stand alongside the moving livestock; or from which to prod hesitant or uncooperative animals. FIG. 5 illustrates conveyor platform 13 with belt 11 removed. This view shows the location and positioning of platform rollers 37 and conveyor rails 35. Two-inch cylindrical rollers spaced with their centers two and one-half inches apart are known to work well, although other configurations for rollers 37 obviously would also prove satisfactory.

Also shown in these views is end idler roller 43, located at the lower end of conveyor platform 13. End idler roller 43 serves to reverse the direction of belt 11 as it returns from underneath the conveyor platform 13, to again pass over the platform rollers 37.

FIG. 5 further illustrates the location of door track 24 and door track engaging rod 28 in relation to finishing house wall 38. This view illustrates the vertical orientation of door track 24 which requires that the upper end of platform 13 travel within a vertical plane.

In reference now to FIG. 6, the livestock loader 10 is installed within a livestock finishing building 44. The livestock transport vehicle 46 has backed up to the door of livestock building 44 and has centered the opening in the truck between the door track members 24. Hinged chute 21 is in the down position and is resting upon the floor of the upper deck of the transport vehicle 46. It should be noted that transport vehicle 46 has an upper and lower deck and by raising or lowering the conveyor platform, chute 21 can be aligned with either deck.

Stop pin 31 is shown located within one of the stop pin holes 32 located in vertical frame member 23. Stop pin 31 is a removable pin which once installed, serves to prevent the unwanted lowering of the conveyor platform which might result from a malfunction or failure of lift mechanism 14. Stop pin 31 and safety switch 29 both serve to greatly enhance the safety of operation of the livestock loader. Also illustrated in phantom lines is entrance ramp 42. Entrance ramp 42 is located at the lower end of the conveyor platform and is attached pivotally to conveyor rails 35. Ramp 42 serves to allow the livestock being loaded an easier foothold upon entering or exiting the lower end of conveyor platform 13. Ramp 42 prevents the livestock from tripping over end idler roller 43.

Accordingly, it is believed that all of the objects mentioned above are accomplished by use of the preferred embodiment disclosed herein. Obviously, many modifications and variations of the present invention are possible in light of the above teachings. It is therefore to be understood that, within the scope of the appended claims, the invention may be practiced otherwise than as specifically described.

I claim:

1. A livestock loading device comprising:
    building means for containing livestock having a loading door;
    wheeled frame means within said building means for movement towards and away from the loading door and having a first and a second end;
    conveyor means having a first and a second end pivotally attached at its second end to the second end of said wheeled frame means and extending over and beyond the first end of said wheeled frame means;
    drive means affixed to said conveyor means for selectively driving the belt of said conveyor means;
    conveyor track means affixed to the jambs of the loading door for confining the movement of the first end of said conveyor means to a substantially vertical plane;
    conveyor track engaging means affixed to the first end of said conveyor means for operation with said conveyor track means; and
    lift means connected between said frame means and said conveyor means for selectively raising and lowering said first end of said conveyor means.

2. The device as described in claim 1 further comprising:
    frame track means affixed to the floor of said building means for confining the movement of said wheeled frame means to a path normal to the door means; and
    frame track engaging means affixed to the sides of said wheeled frame means for operation with said frame track means.

3. The device as described in claim 1 wherein said conveyor comprises:
    a rough topped, endless, flexible belt;
    a roller belt support platform with a plurality of spaced apart rollers; and
    belt tightening means for selectively adjusting the tension on said belt.

4. The device as described in claim 1 further comprising:
    a vertical frame member with an upper end and a lower end, attached at said lower end to said frame means at a point distal to the said pivotal attachment of said frame means to said second end of said conveyor having a removable safety stop means for preventing said conveyor from falling from a raised position once said safety stop is installed.

5. The device as described in claim 1 further comprising:
    an automatic lift deactivation means for automatically deactivating said lift means once said conveyor reaches a predetermined height.

6. The device as described in claim 1 further comprising:
    vertical side board means for preventing livestock from leaving the device other than at said first end or said second end of said conveyor, attached to said conveyor.

7. The device as described in claim 6 further comprising:
    chute means for providing an exit ramp for livestock during the operation of said device, pivotally affixed to said vertical sideboards at said first end of said conveyor.

8. The device as described in claim 6 further comprising:
    entry ramp means for providing an inclined entrance ramp during the operation of said device affixed at said second end of said conveyor.

* * * * *